(12) United States Patent
Lopez et al.

(10) Patent No.: US 12,118,516 B2
(45) Date of Patent: Oct. 15, 2024

(54) DATA CENTER GUIDE CREATION FOR AUGMENTED REALITY HEADSETS

(71) Applicant: International Business Machines Corporation, Armonk, NY (US)

(72) Inventors: Rodolfo Lopez, Austin, TX (US); Jonathan Terner, Beacon, NY (US); Ricardo Daniel Zamora Ruvalcaba, Tlaquepaque (MX); Gandhi Sivakumar, Bentleigh (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 253 days.

(21) Appl. No.: 17/656,309

(22) Filed: Mar. 24, 2022

(65) Prior Publication Data

US 2023/0306376 A1    Sep. 28, 2023

(51) Int. Cl.
*G06T 11/00*    (2006.01)
*G06F 40/295*    (2020.01)
(Continued)

(52) U.S. Cl.
CPC .......... *G06Q 10/20* (2013.01); *G06F 40/295* (2020.01); *G06T 11/00* (2013.01); *G06T 19/006* (2013.01); *G06V 20/20* (2022.01)

(58) Field of Classification Search
None
See application file for complete search history.

(56) References Cited

U.S. PATENT DOCUMENTS

| 8,749,396 B2 | 6/2014 | Maggiore |
| 9,838,844 B2 | 12/2017 | Emeis |

(Continued)

FOREIGN PATENT DOCUMENTS

| CN | 109781431 B | 12/2019 |
| JP | 6016268 B2 | 10/2016 |
| WO | 2019108651 A1 | 6/2019 |

OTHER PUBLICATIONS

Deffeyes, S., "Mobile augmented reality in the data center", IBM J. Res. & Dev. vol. 55 No. 5 Paper 5 Sep./Oct. 2011, © 2011 IBM, 5 pages.

(Continued)

*Primary Examiner* — Nurun Flora
(74) *Attorney, Agent, or Firm* — Heather Johnson; Andrew D. Wright; Calderon Safran & Wright P.C.

(57) ABSTRACT

A method, computer program product and computer system to automatically generate augment reality-based guides for maintenance procedures is provided. A processor retrieves non-structured text instructions to perform a maintenance procedure on a device within a data center. A processor extracts at least one imperative statement from the non-structured text instructions. A processor identifies a named entity in the extracted at least one imperative statement from the non-structured text instructions. A processor generates a mapping of the named entity to be used by an augmented reality device, where the mapping indicates the position of the named entity on the device within a data center. A processor provides to the augmented reality device the extracted at least one imperative statement and the mapping of the named entity, where the augmented reality device displays the extracted imperative statement and the mapping of the named entity to a user of the augmented reality device.

20 Claims, 6 Drawing Sheets

(51) Int. Cl.
  *G06Q 10/20* (2023.01)
  *G06T 19/00* (2011.01)
  *G06V 20/20* (2022.01)

(56) References Cited

U.S. PATENT DOCUMENTS

| | | | |
|---|---|---|---|
| 10,603,113 | B2 | 3/2020 | Lang |
| 10,768,605 | B2 | 9/2020 | Dalal |
| 10,907,963 | B2 | 2/2021 | Bender |
| 11,080,939 | B1 | 8/2021 | Lafranchi |
| 2014/0310595 | A1 | 10/2014 | Acharya |
| 2016/0140868 | A1* | 5/2016 | Lovett ............... G09B 19/0053 434/118 |
| 2018/0239144 | A1 | 8/2018 | Woods |
| 2019/0060708 | A1 | 2/2019 | Fung |
| 2019/0286906 | A1* | 9/2019 | Bivens ............... G06V 20/20 |
| 2019/0362556 | A1 | 11/2019 | Ben-Dor |
| 2020/0117529 | A1 | 4/2020 | Qiao |
| 2020/0242848 | A1 | 7/2020 | Ambler |
| 2021/0027643 | A1 | 1/2021 | Schume |
| 2021/0112145 | A1 | 4/2021 | Amarpal |
| 2021/0233294 | A1 | 7/2021 | Nunez |
| 2022/0096197 | A1 | 3/2022 | Song |

OTHER PUBLICATIONS

Disclosed Anonymous, "Augmented Reality for Cabling Systems", An IP.com Prior Art Database Technical Disclosure, IP.com No. IPCOM000250117D, IP.com Electronic Publication Date: Jun. 1, 2017, 5 pages.

Disclosed Anonymous, "Using Augmented Reality to Enhance Diagnostics, Repair and Assembly", An IP.com Prior Art Database Technical Disclosure, IP.com No. IPCOM000223150D, IP.com Electronic Publication Date: Nov. 5, 2012, 3 pages.

He et al., "An AR Operation and Maintenance System for Data Center", 2018 International Conference on Computer Science and Software Engineering (CSSE 2018), 13 pages.

"IBM Appendix P", List of patents and patent applications to be treated as related, Filed Herewith, 2 pages.

Anonymous, "Human error most likely cause of datacentre downtime, finds study," ComputerWeekly [online], Mar. 18, 2013, 3 pages, Retrieved from the Internet: <URL: https://www.computerweekly.com/news/2240179651/Human-error-most-likely-cause-of-datacentre-downtime-finds-study>.

Sao et al., "Data Center Guide Creation and Cost Estimation for Augmented Reality Headsets", U.S. Appl. No. 18/450,442, filed Aug. 16, 2023, 39 pages.

\* cited by examiner

DATA CENTER GUIDE CREATION FOR AUGMENTED REALITY HEADSETS

BACKGROUND OF THE INVENTION

The present invention relates generally to the field of data center maintenance, and more particularly to creating interactive guides for use with augmented reality headsets.

Data centers are large, dedicated spaces used to house various computer systems to provide a variety of services, such as website hosting. Large swaths of devices and components are deployed to meet demand and provide flexibility in case a device or component fails. Due to the large number of devices, maintenance and inspection of the data center devices is a common task within data centers. Augmented reality headsets are typically head-mounted displays (HMDs) that a user wears. Unlike virtual reality headsets, an augmented reality headsets permits the user to see their surroundings while overlaying, or augmenting, the user's view through the HMD device with additional information.

SUMMARY

Embodiments of the present invention provide a method, system, and program product to automatically generate augmented reality-based guides for maintenance procedures. A processor retrieves non-structured text instructions to perform a maintenance procedure on a device within a data center. A processor extracts at least one imperative statement from the non-structured text instructions. A processor identifies a named entity in the extracted at least one imperative statement from the non-structured text instructions. A processor generates a mapping of the named entity to be used by an augmented reality device, where the mapping indicates the position of the named entity on the device within a data center. A processor provides to the augmented reality device the extracted at least one imperative statement and the mapping of the named entity, where the augmented reality device displays the extracted imperative statement and the mapping of the named entity to a user of the augmented reality device.

DETAILED DESCRIPTION

Figure 1:
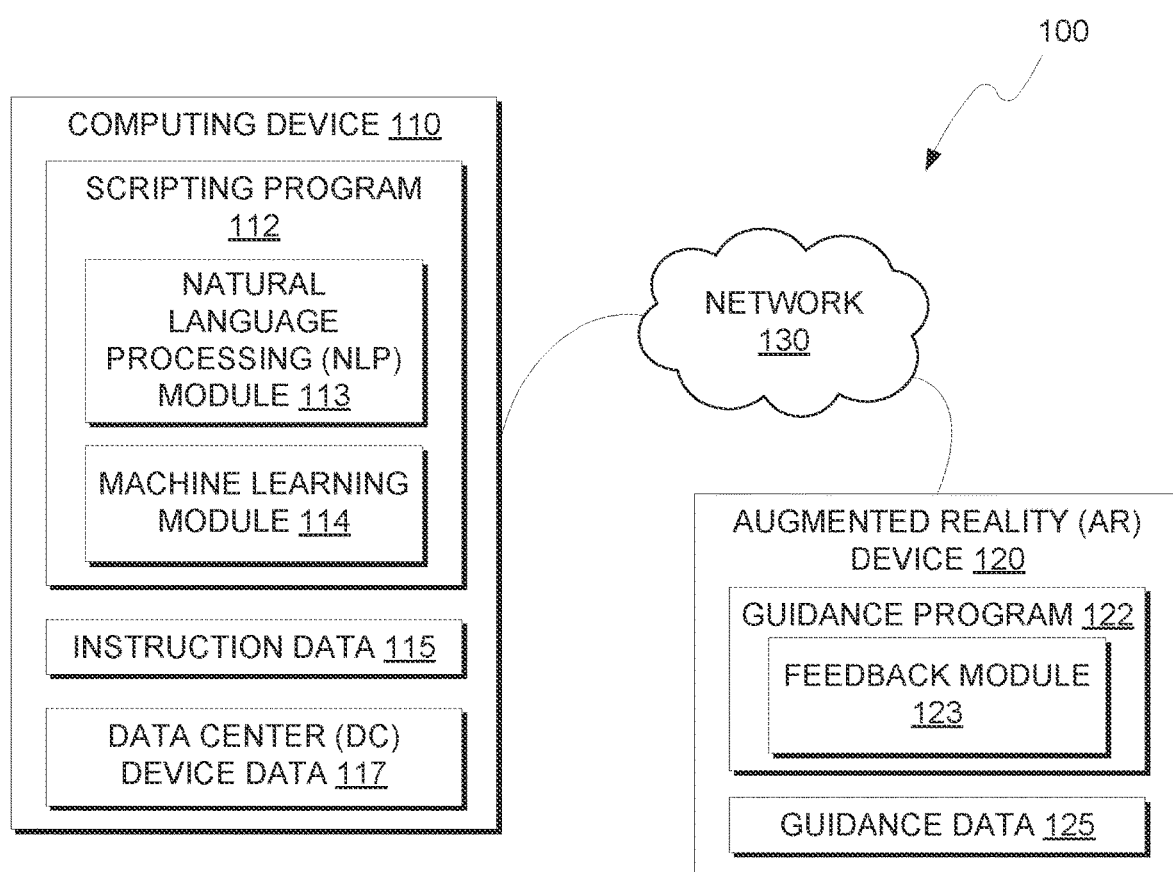
FIG. 1 is a functional block diagram illustrating a networked environment, in accordance with an exemplary embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating networked environment, generally designated 100, in accordance with one embodiment of the present invention. Networked environment 100 includes computing device 110 and augmented reality (AR) device 120 connected over network 130. Computing device 110 includes scripting program 112, natural language processing (NLP) module 113, machine learning module 114, instruction data 115, and data center (DC) device data 117. AR device 120 includes guidance program 122, feedback module 123 and guidance data 125.

In various embodiments of the present invention, computing device 110 and AR device 120 are each a computing device that can be a standalone device, a server, a laptop computer, a tablet computer, a netbook computer, a personal computer (PC), or a desktop computer. In another embodiment, computing device 110 or AR device 120 represents a computing system utilizing clustered computers and components to act as a single pool of seamless resources. In general, computing device 110 or AR device 120 can be any computing device or a combination of devices with access to instruction data 115, data center (DC) device data 117 and guidance data 125 and is capable of executing scripting program 112, NLP module 113, machine learning module 114, guidance program 122 and feedback module 123. Computing device 110 and AR device 120 may include internal and external hardware components, as depicted and described in further detail with respect to FIG. 5.

In this exemplary embodiment, scripting program 112, NLP module 113, machine learning module 114, instruction data 115, and DC device data 117 are stored on computing device 110; and guidance program 122, feedback module 123 and guidance data 125 are stored on AR device 120. However, in other embodiments, scripting program 112, NLP module 113, machine learning module 114, instruction data 115, DC device data 117 guidance program 122, feedback module 123 and guidance data 125 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 110 and AR device 120, in accordance with a desired embodiment of the present invention.

In various embodiments, augmented reality (AR) device 120 is worn, or otherwise utilized, by a user in a data center. Data center, as used herein, is any building, location or structure that houses various computing systems for a variety of purposes, such as website hosting, data storage or providing on-demand services and/or platforms. One of ordinary skill in the art will appreciate, based on the discussion contained herein, that embodiments of the present invention may be utilized in other production or industrial environments without deviating from the invention. While wearing AR device 120, the user may move around the data center while viewing various devices in the data center.

In various embodiments, guidance program 122 display various overlays and other visual elements onto a display or projection medium of AR device 120. The visual elements, as discussed herein, provide indications of maintenance work needed to be performed on specific devices in the data center. Additionally, the visual elements also include a visual guide to help the user perform the maintenance of the specific device in the data center that needs maintenance. As discussed herein, AR device 120 is any device that augments or changes a user's real-world view with one or more visual elements. For example, AR device 120 may be a set of AR glasses or AR googles that are worn by the users that have transparent lenses. AR device 120 also includes a small projector to project images onto the lenses, creating an enhanced or augmented view of the user's surroundings. While the following is discussed regarding an augmented reality device which augments a user's view of their surroundings, AR device 120 may also be a mixed reality device. Mixed reality devices include displays and cameras, with the cameras acting as the user's "eyes", recording the user's surroundings, and recreating the user's view on a head mounted display, similar to a virtual reality device. Where an alert or guidance is displayed as an overlay on an augmented reality device, guidance program 122 would instead embed the alert or guidance into the head mounted display output of the mixed reality device.

In various embodiments, scripting program 112 digests non-structured text data from instruction data 115 to generate guidance data 125. Instruction data 115 is non-structured text that includes the steps necessary to perform a maintenance routine for a data center device or component. For example, a provider of a storage array utilized in the data center has provided text instructions to service storage disks housed within the array. As another example, a power distribution unit that supplies power to a rack or enclosure in the data center includes instructions for troubleshooting various warnings or issues. In both examples, instruction data 115 includes various text-based steps to be performed regarding specific maintenance issues that may arise with any device or component used within the data center.

In various embodiments, scripting program 112 includes a natural language processing (NLP) module 113. While digesting instruction data 115 for various devices and components used in the data center, scripting program 112 utilizes NLP module 113 to determine and extract instructive statements from instruction data 115. As previously stated, instruction data 115 are non-structured text documents, which are comprised of text without any embeddings or other computer readable syntax that denote meaning or placement. For example, a structured text document would be a comma-separated-value (CSV) file for a data table; where an unstructured text document would be an image of the table itself.

In various embodiments, NLP module 113 extracts instructive statements from instruction data 115 identifying imperative statements contained in instruction data 115. Since imperative statements are typically associated with steps to be performed during the test and not a result (e.g., "Run Diagnostics" or "Check that ETH0 on the switch is connected to terminal device"). Imperative sentences are commands or instructions that tell what someone should do. NLP module 113 identifies imperative statements based on a lack of a main subject in the sentence (e.g., "Run Diagnostics" where the subject is implied as the user and not stated) and only includes objects (e.g., "terminal device" and the "ETH0" switch port) to which the action is applied to, which is typical of troubleshooting and maintenance.

In various embodiments, data center (DC) device data 117 includes information regarding each device and component that is in use or otherwise used in operations within the data center. DC device data 117 includes physical layouts of each device including locations of ports, readouts and any other input or output of the devices or components. Additionally, DC device data 117 includes any on-site configuration of racks or enclosures used in the data center. Each rack or enclosure may have a variety of devices and components housed within. DC device data 117 includes data indicative of the which devices are in each enclosure, as well as the device's location and orientation within the enclosure. As discussed herein, DC device data 117 is utilized by scripting program 112 to develop AR device 120 guidance data 125 such that guidance program 122 is capable of identifying and highlighting or emphasizing the I/O and other interfaces of the DC devices.

In various embodiments, scripting program 112 generates guidance data 125 based on the extracted instructions of instruction data 115 and the layout and orientation of data center devices indicated in DC device data 117. For each type of maintenance or troubleshooting procedure indicated in instruction data 115, scripting program 112 generates an AR guide that includes a list of tasks or steps to perform the procedure that is extracted from instruction data 115. For each step, the objects or subjects extracted are compared to DC device data 117 to determine the location of each port, I/O, or interface on the device. Guidance data 125 includes various procedures generated from extracting instructions in instruction data 115 for a variety of maintenance procedures that may be performed for any DC device. Additionally, for each step in the procedure, guidance data 125 includes data utilized to determine the location of parts or interfaces used in the procedure. As depicted in FIG. 1, guidance data 125 resides on AR device 120. In other embodiments, guidance program 122 of AR device 120 may retrieve guidance data 125 for a specific procedure when performed on computing device 110 or another device (not shown) connected to network 130.

Once guidance data 125 is generated for a procedure, AR device 120 is capable of assisting a user to perform the procedure. In some scenarios, a user may be on the operational floor of the data center. Guidance program 122 may then receive any alerts or maintenance requests regarding issues or work needed to be done for a DC device. As the user approaches the device, guidance program 122 monitors the location and view of the user. Once the device is within a certain distance of the user, guidance program 122 starts the relevant guide in guidance data 125 for the procedure. For each step in the procedure, guidance program 122 identifies the relevant ports, interfaces, components, and the like of the DC device and highlights the interfaces relevant for each step, while also displaying the instructive statements extracted from instruction data 115 by NLP module 113. As the user performs the procedure and advances through each step, guidance program 122 displays the text for the next step and highlights any relevant interface to the current step.

In various embodiments, scripting program 112 determines the location of interfaces on a DC device based on machine vision applied by guidance program 122 while a user is viewing or servicing the DC device. AR device 120 includes one or more cameras that capture to view or surrounding of the user. Guidance data 125 includes schematics, diagrams or other types of images that indicate the layout and interfaces of a DC device. By comparing the captured images of the device to known schematics, guidance program 122 can identify and highlight or otherwise emphasize to the user which port or interface is used in a particular step of the maintenance procedure. As guidance program 122 executes guidance data 125 for a particular procedure, guidance program 122 identifies the relevant interfaces for each step and highlights or otherwise emphasize to the user the location of the interface.

In various embodiments, feedback module 123 receives feedback from the user after or during a maintenance procedure. Guidance program 122 sends the feedback to machine learning module 114. Based on the type of feedback, machine learning module 114 updates guidance data 125 provided to users of AR device 120 for similar procedures. Feedback module 123 sends the feedback to machine learning module 114 along with other relevant information such as the rack, enclosure, location, and device related to the specific maintenance that was performed. For example, a user provides feedback that the incorrect port was highlighted during a step of a procedure to feedback module 123. Machine learning module 114 identifies the port correction in the feedback. Then machine learning module 114 updates guidance data 125 such that the particular step states the correct port. Also, machine learning module 114 updates DC device data 117 such that guidance program 122 of AR device 120 will correctly point to the correct relative location of the new port. In some embodiments, machine learning module 114 collects more than one feedback from users of AR device 120 during various procedures previously performed. Machine learning module 114 collates the feedback to identify common changes or mistakes in guidance data 125 as indicated by the various feedback.

Figure 2:
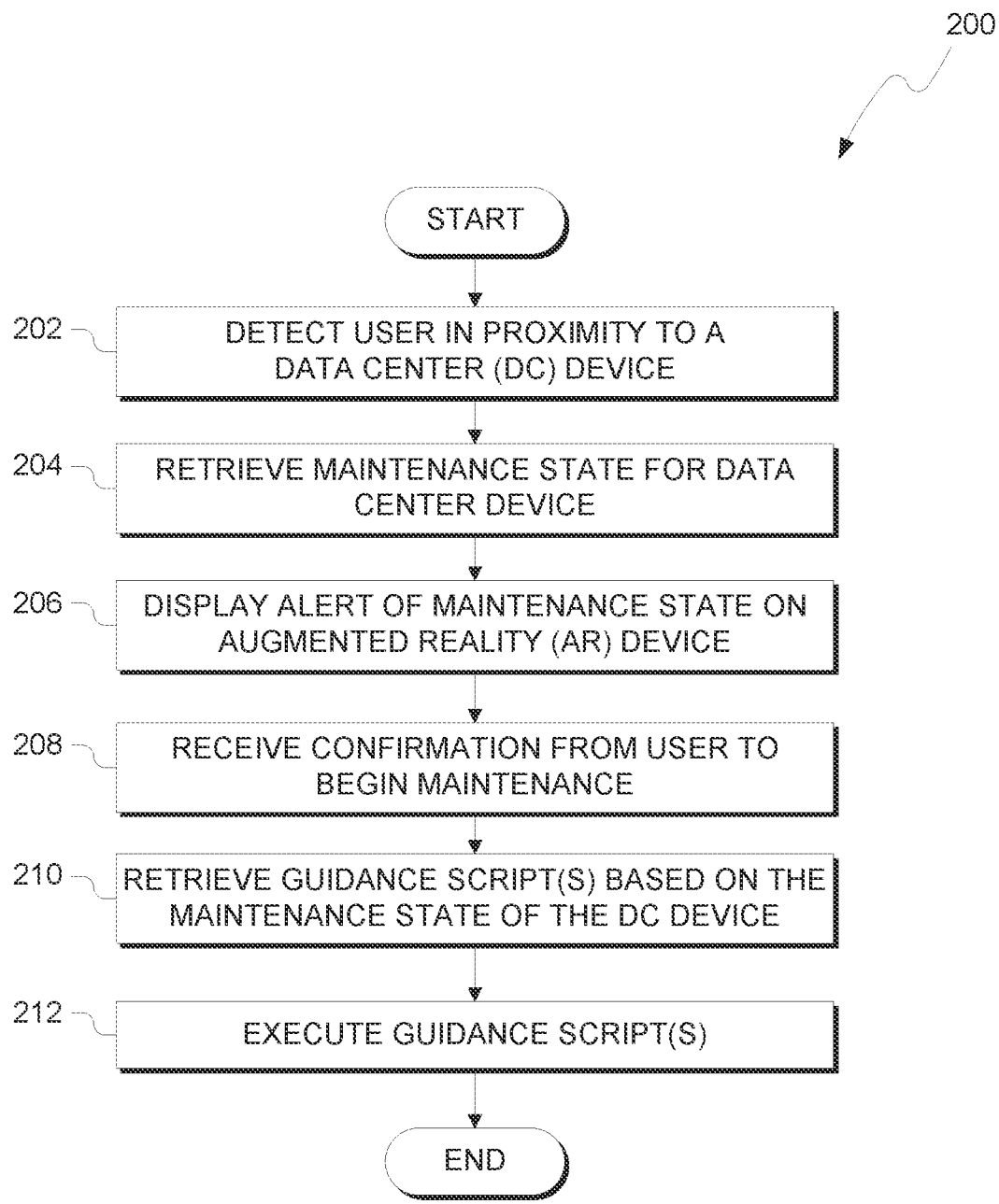
FIG. 2 illustrates operational processes of a guidance program, on a computing device within the environment of FIG. 1, in accordance with an exemplary embodiment of the present invention.

FIG. 2 illustrates operational processes, generally designated 200, of guidance program 122 on AR device 120. In process 202, guidance program 122 detects a user is in proximity to a data center (DC) device. Guidance program 122 monitors the location of the user within the data center and as the user approaches various devices in the data center, guidance program 122 retrieves the maintenance states of the nearby DC devices to the user of AR device 120 (process 204). In process 206, if a device has a pending maintenance task, error, or other service procedure, then guidance program 122 displays an alert to the user stating the procedure to be performed. In process 208, guidance program 122 receives input from the user to start the procedure. In some scenarios, the input may be a voice command or response from the user to start the procedure. In process 210, guidance program 122 retrieves and guidance scripts from guidance data 125 needed to perform the procedure based on the maintenance state of the device to be serviced.

In process 212, guidance program 122 executes the guidance scripts for the procedures to be performed. As discussed herein, guidance data 125 includes a set of steps needed to be performed that have been automatically altered by NLP module 113 to address the specific device within the data center for the procedure. While some devices may have a default operational state, many data center devices are configured in specific ways to handling subnetting and other networking issues. NLP module 113 digests manufacture provided instruction data 115, extract instructive statements from instruction data 115, and reformats the sentences to address the specific configurations of the DC device. As such, guidance program 122 provides a tailored guide that is automatically generated from generic manufacturer documentation. Additionally, guidance data 125 is enriched with DC device data 117 by NLP module 113 such that the position and location of DC devices, as well as ports and other interfaces, are used by guidance program 122 to highlight or emphasize the correct devices and interfaces used in each step of the procedure.

Figure 3:
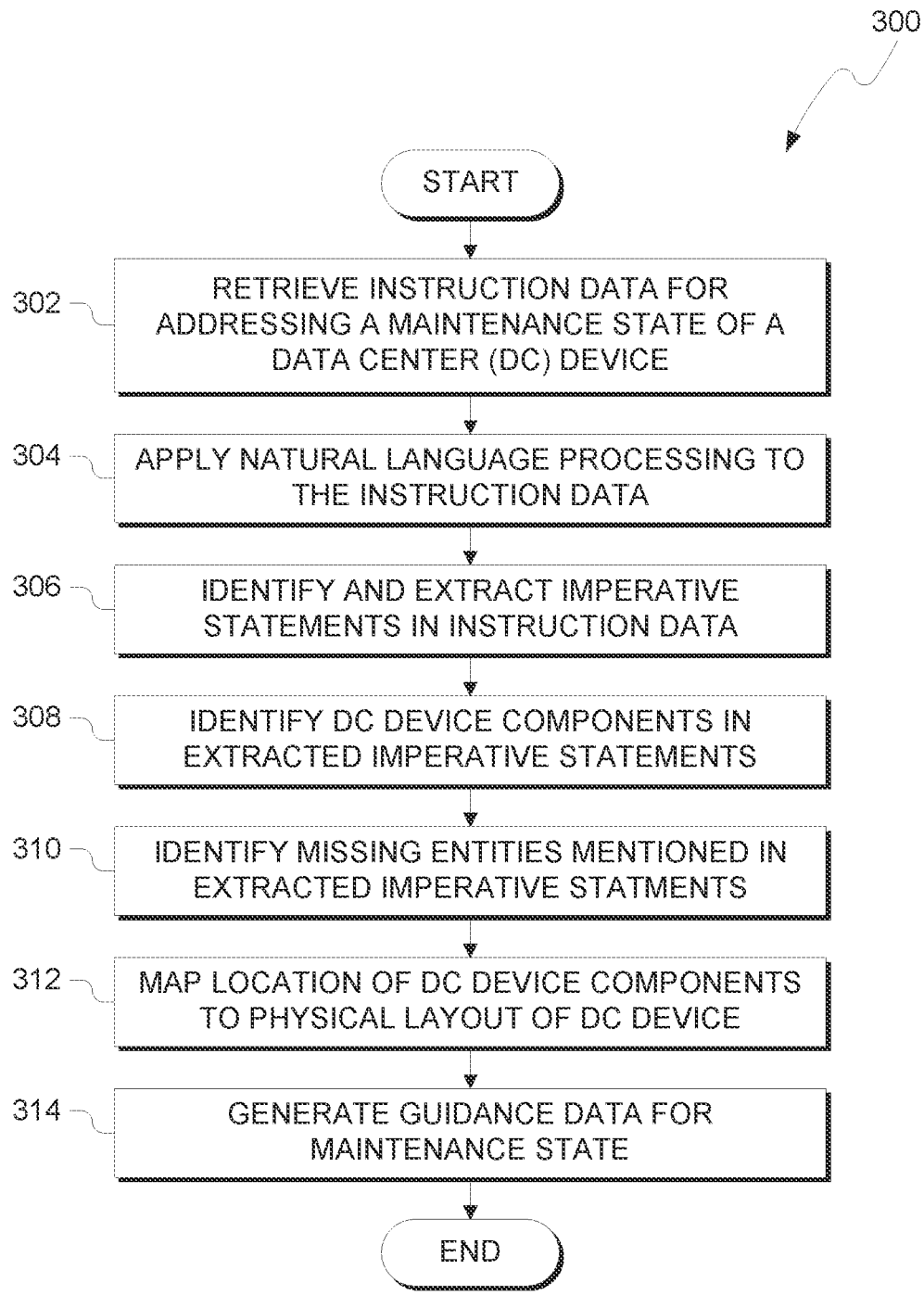
FIG. 3 illustrates operational processes of a scripting program, on a computing device within the environment of FIG. 1, in accordance with an exemplary embodiment of the present invention.

FIG. 3 illustrates operational processes, generally designated 300, of scripting program 112. In process 302, scripting program 112 retrieves instruction data 115 related to a procedure or task to address a maintenance state of a DC device. In process 304, scripting program 112 applies natural language processing via NLP module 113 to instruction data 115. As discussed herein, instruction data 115 is non-structured text typically provided by a provider or manufacturer of the DC device.

In process 306, NLP module 113 of scripting program 112 identifies and extracts imperative statements from instruction data 115. For example, NLP module 113 deploys parts-of-speech (POS) tagging to determine if the sentence is an imperative statement. POS tagging tokenizes strings of text from instruction data 115 and assigns a token to each word indicating the "part-of-speech" the words are within the structure of the sentence. Typically, imperative statements are instructive and lack as main subject ("Set gateway address to 192.168.0.1"). If the POS tagging indicates such a sentence structure, scripting program 112 extracts the sentence from instruction data 115 to be included as a step in guidance data 125, after the following processes.

In process 308, scripting program 112 identifies the objects in the extracted sentences and compares the objects to DC device data 117. DC device data 117 includes schematics or other models that indicate the size and layout of various inputs, outputs, interfaces, and other connections of the DC device. When scripting program 112 identifies that a step mentions a part or other component of the device, scripting program 112 retrieves the schematics and models of the device to determine a location of the part on the device. Once identified, scripting program 112 embeds within the generated guidance data 125 data indicative of the location of the parts on the DC device, such that when a user follows guidance data 125, for a particular procedure, guidance program 122 highlights or emphasizes the part relevant to each step of the procedure as the procedure is being performed.

In some scenarios, either due to incorrect documentation or conflicting names and identifiers used between instruction data 115 and DC device data 117, scripting program 112 may not be able to identify entities mentioned in instruction data 115 within DC device data 117 (process 310). In such scenarios, scripting program 112 creates a notification or alert to instruct a developer or other user to update DC device data 117 to indicate the location of the missing entities.

In process 312, scripting program 112 maps the location of components of the DC device to a location on a physical instance of the device. In some scenarios, based on the type of detection used by AR device 120, scripting program 112 generates a mapping of the location of the component within DC device's enclosure. For example, AR device 120 utilizes machine vision to determine the DC devices within a user's view. In this example, scripting program 112 generates images to use in the machine vison process with embeddings indicating where each component is located within the images. In process 314, scripting program 112 generates guidance data 125 for the procedure. Guidance data 125 includes the extract imperative statements along with locational embedding of components utilized in each step of the procedure.

Figure 4:
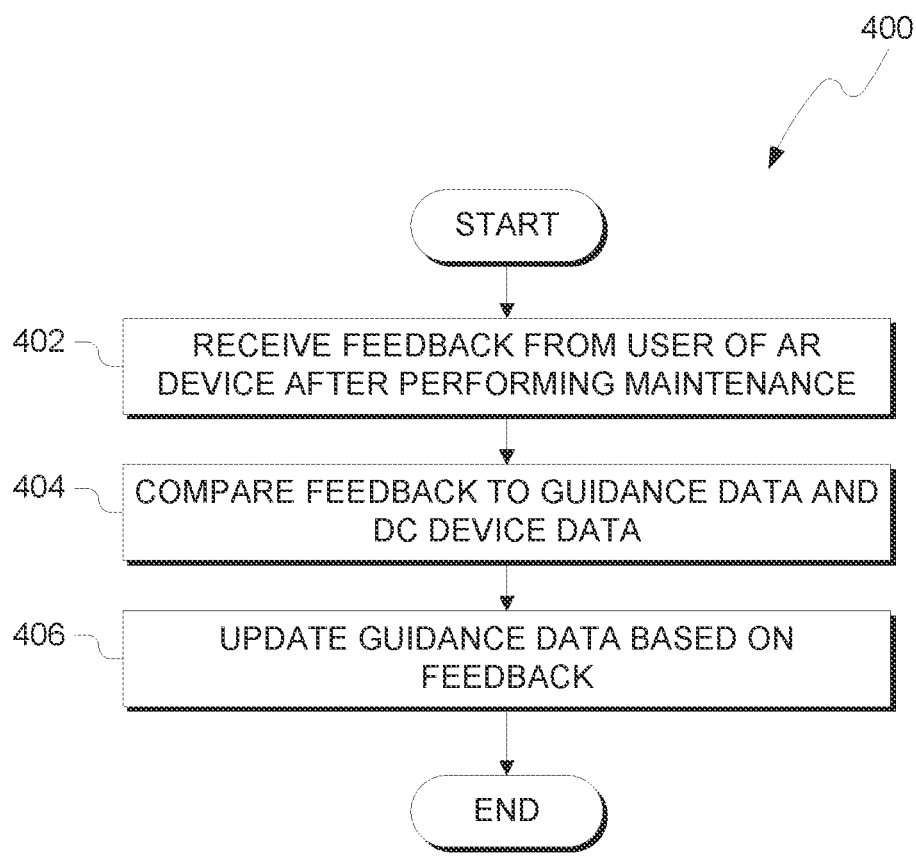
FIG. 4 illustrates operational processes of a machine learning module, on a computing device within the environment of FIG. 1, in accordance with an exemplary embodiment of the present invention.

FIG. 4 illustrates operational processes, generally designated 400, of machine learning module 114 of scripting program 112. In process 402, machine learning module 114 receives feedback from a user of AR device 120. The user of AR device 120 provides feedback regarding a specific guide in guidance data 125 related to a maintenance procedure the user has performed. In some scenarios, the user provides feedback while performing the procedure. In various embodiments, feedback module 123 of guidance program 122 receives feedback from a user regarding corrections or other changes the user believe should be made for the procedure. For example, a DC device may have a specific configuration that is not part of instruction data 115 that was provided by a manufacturer of the DC device. Network configurations, such as gateways, proxies and the like, may be unique not only for the data center but for each device. The user can provide feedback to feedback module 123 to indicate these custom configurations that need to be updated in guidance data 125. In other scenarios, the feedback may correct or change the text contained in guidance data 125. If a guide erroneously states the wrong interface or is otherwise providing an incorrect step in the procedure, the user can provide feedback regarding the incorrect step.

In process 404, machine learning module 114 compares the received feedback to the configurations for the DC device or corrections to the steps of a given procedure. In process 406, if the feedback changes any configurations or has corrections, then machine learning module 114 updates guidance data 125 accordingly. In some embodiments, machine learning module 114 alter guidance data 125 based on preferences or other suggestions of each user of AR device 120. For example, one user may provide suggestions regarding the interface names suggesting the change of "ETH0" to "Port 0". For stylistic or preferential changes, machine learning module 114 alters only guidance data 125 delivered to the user who changed guidance data 125 based on preference. If machine learning module 114 identifies a common change among users, then machine learning module 114 updates guidance data 125 for new users to include the preferential change of other users. This way current techs and users can train guidance data 125 to their liking, while new users can gain the benefit of frequent or common changes made by other users.

Figure 5A:
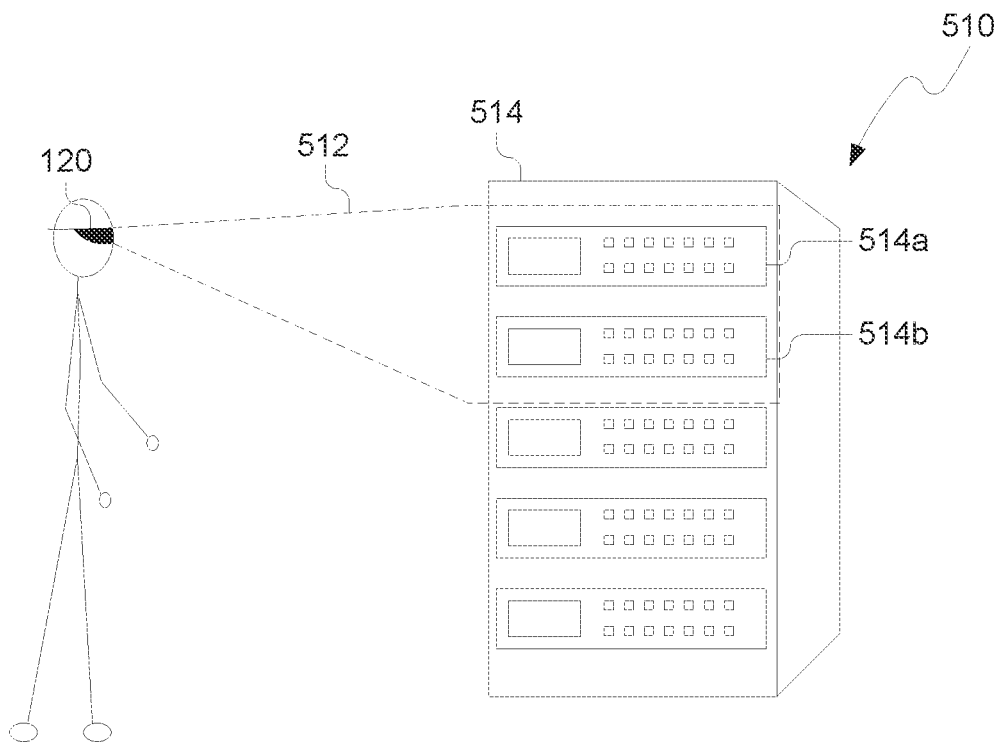
FIGS. 5A and 5B depict example visualizations of a user utilizing an augmented reality device, in accordance with an exemplary embodiment of the present invention.
Figure 5B:
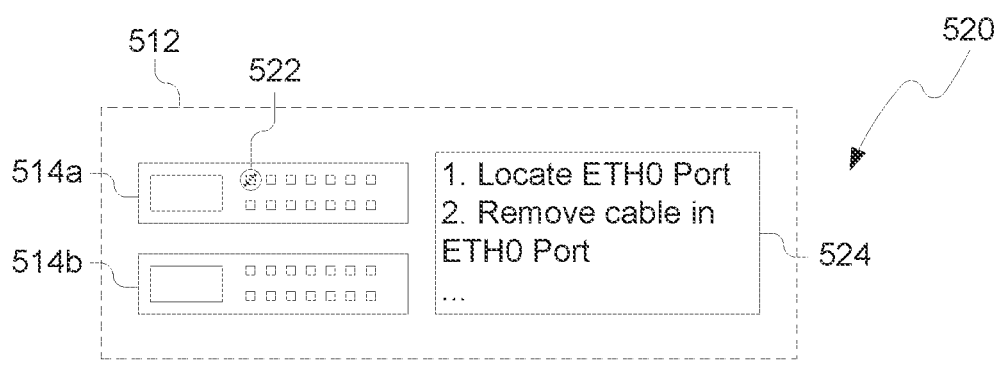

FIGS. 5A and 5B depict visualizations, designated 510 and 520 respectively, of a user of AR device 120 performing a maintenance procedure. FIG. 5A depicts visualization 510 of a user of AR device 120 viewing DC device 514. In this example, components 514a and 514b are in the user's view 512, of which the user's view can be augmented by AR device 120 of components 514a and 514b, as depicted in FIG. 5B. FIG. 5B depicts visualization 520 of user's view 512. In this example, component 514a of DC device 514 requires maintenance. Once the user approaches the DC device and guidance program 122 identifies the DC device is within the user's view, guidance program 122 generates highlight 522 and guide 524 as an overlay of AR device 120 such that the user see's visualization 520 that includes real world components 514a and 514b as well as the augmented visual overlays on AR device 120 of highlight 522 and guide 524. As the user follows guidance data 125, guide 524 displays the steps of the procedure to be performed. Additionally, guidance program 122 generates highlight 522 of any interface, device, component or the like involved with each step. In this example, the "ETH0" port is involved in the current steps of the procedure. As such, guidance program 122 identifies the location of the port via machine vision, as discussed herein, and highlights or otherwise brings attention to the interface to the user via highlight 522.

Figure 6:
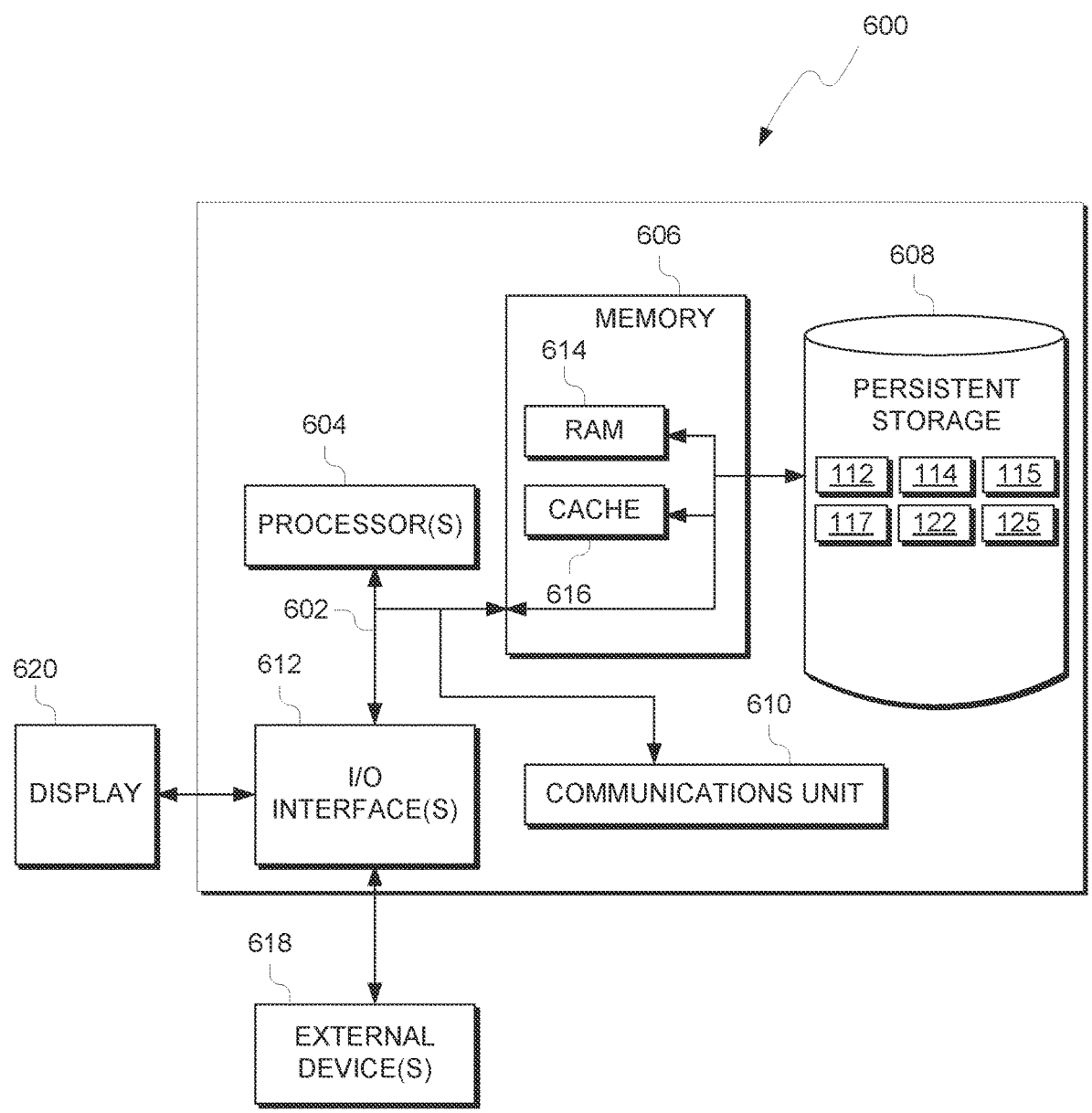
FIG. 6 depicts a block diagram of components of the computing device executing scripting program and a guidance program, in accordance with an exemplary embodiment of the present invention.

FIG. 6 depicts a block diagram, 600, of components of computing device 110 and AR device 120, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing device 110 and AR device 120 each includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Scripting program 112, NLP module 113, machine learning module 114, instruction data 115, DC device data 117, guidance program 122, feedback module 123 and guidance data 125 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network 130. In these examples, communications unit 610 includes one or more network interface cards. Communications unit 610 may provide communications through the use of either or both physical and wireless communications links. Scripting program 112, NLP module 113, machine learning module 114, instruction data 115, DC device data 117, guidance program 122, feedback module 123 and guidance data 125 may be downloaded to persistent storage 608 through communications unit 610.

I/O interface(s) 612 allows for input and output of data with other devices that may be connected to computing device 110 and AR device 120. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., scripting program 112, NLP module 113, machine learning module 114, instruction data 115, DC device data 117, guidance program 122, feedback module 123 and guidance data 125, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method comprising:
    retrieving, by one or more processors, non-structured text instructions to perform a maintenance procedure on a device within a data center;
    extracting, by the one or more processors, at least one imperative statement from the non-structured text instructions;
    identifying, by the one or more processors, a named entity in the extracted at least one imperative statement from the non-structured text instructions;
    generating, by the one or more processors, a mapping of the named entity to be used by an augmented reality device, wherein the mapping indicates the position of the named entity on the device within a data center; and
    providing, by the one or more processors, to the augmented reality device the extracted at least one imperative statement and the mapping of the named entity, wherein the augmented reality device displays the extracted at least one imperative statement and the mapping of the named entity to a user of the augmented reality device while performing the maintenance procedure.

2. The method of claim 1, the method further comprising:
    identifying, by the one or more processors, the user is in proximity to the device within the data center with pending maintenance; and
    alerting, by the one or more processors, the user of the pending maintenance.

3. The method of claim 1, the method further comprising:
    identifying, by the one or more processors, the named entity in a captured image of the device within the data center from a user's view via the augmented reality device; and
    highlighting, by the one or more processors, the named entity within the user's view of the device within the augmented reality device.

4. The method of claim 1, the method further comprising:
    assigning, by the one or more processors, a plurality of part-of-speech tags to the non-structured text instructions;
    extracting, by the one or more processors, the at least one imperative statement from the non-structured text instructions, wherein the at least one imperative statement does not have a main subject part-of-speech tag.

5. The method of claim 1, the method further comprising:
    receiving, by the one or more processors, feedback from the user of the augmented reality device regarding the maintenance procedure; and
    generating, by the one or more processors, a custom guide for the user including the extracted at least one imperative statement based on the feedback from by the user.

6. The method of claim 5, the method further comprising:
    collecting, by the one or more processors, a plurality of feedback from a plurality of users that performed the maintenance procedure;
    identifying, by the one or more processors, a common change in the plurality of feedback; and
    generating, by the one or more processors, a new user guide for the maintenance procedure based on the common change in the plurality of feedback.

7. The method of claim 6, wherein one or more existing guides for the maintenance procedure are not updated.

8. A computer program product comprising:
    one or more computer-readable storage media and program instructions stored on the one or more computer-readable storage media, the program instructions comprising:
    program instructions to retrieve non-structured text instructions to perform a maintenance procedure on a device within a data center;
    program instructions to extract at least one imperative statement from the non-structured text instructions using part-of-speech tagging;
    program instructions to identify a named entity in the extracted at least one imperative statement from the non-structured text instructions;
    program instructions to generate a mapping of the named entity to be used by an augmented reality device, wherein the mapping indicates the position of the named entity on the device within a data center; and
    program instructions to provide to the augmented reality device the extracted at least one imperative statement and the mapping of the named entity, wherein the augmented reality device displays the extracted at least one imperative statement and the mapping of the named entity to a user of the augmented reality device while performing the maintenance procedure.

9. The computer program product of claim 8, the program instructions further comprising:
    program instructions to identify the user is in proximity to the device within the data center with pending maintenance; and
    program instructions to alert the user of the pending maintenance.

10. The computer program product of claim 8, the program instructions further comprising:
    program instructions to identify the named entity in a captured image of the device within the data center from a user's view via the augmented reality device; and
    program instructions to highlight the named entity within the user's view of the device within the augmented reality device.

11. The computer program product of claim 8, the program instructions further comprising:
    program instructions to assign a plurality of part-of-speech tags to the non-structured text instructions;
    program instructions to extract the at least one imperative statement from the non-structured text instructions, wherein the at least one imperative statement does not have a main subject part-of-speech tag.

12. The computer program product of claim 8, the program instructions further comprising:
    program instructions to receive feedback from the user of the augmented reality device regarding the maintenance procedure; and
    program instructions to generate a custom guide for the user including the extracted at least one imperative statement based on the feedback from by the user.

13. The computer program product of claim 12, the program instructions further comprising:
- program instructions to collect a plurality of feedback from a plurality of users that performed the maintenance procedure;
- program instructions to identify a common change in the plurality of feedback; and
- program instructions to generate a new user guide for the maintenance procedure based on the common change in the plurality of feedback.

14. The computer program product of claim 13, wherein one or more existing guides for the maintenance procedure are not updated.

15. A computer system comprising:
- one or more computer processors;
- one or more computer readable storage media; and
- program instructions stored on the computer readable storage media for execution by at least one of the one or more processors, the program instructions comprising:
- program instructions to retrieve non-structured text instructions to perform a maintenance procedure on a device within a data center;
- program instructions to extract at least one imperative statement from the non-structured text instructions;
- program instructions to identify a named entity in the extracted at least one imperative statement from the non-structured text instructions by comparing an object in the extracted at least one imperative statement to device data of the data center;
- program instructions to generate a mapping of the named entity to be used by an augmented reality device, wherein the mapping indicates the position of the named entity on the device within a data center; and
- program instructions to provide to the augmented reality device the extracted at least one imperative statement and the mapping of the named entity, wherein the augmented reality device displays the extracted at least one imperative statement and the mapping of the named entity to a user of the augmented reality device while performing the maintenance procedure.

16. The computer system of claim 15, the program instructions further comprising:
- program instructions to identify the user is in proximity to the device within the data center with pending maintenance; and
- program instructions to alert the user of the pending maintenance.

17. The computer system of claim 15, the program instructions further comprising:
- program instructions to identify the named entity in a captured image of the device within the data center from a user's view via the augmented reality device; and
- program instructions to highlight the named entity within the user's view of the device within the augmented reality device.

18. The computer system of claim 15, the program instructions further comprising:
- program instructions to assign a plurality of part-of-speech tags to the non-structured text instructions;
- program instructions to extract the at least one imperative statement from the non-structured text instructions, wherein the at least one imperative statement does not have a main subject part-of-speech tag.

19. The computer system of claim 15, the program instructions further comprising:
- program instructions to receive feedback from the user of the augmented reality device regarding the maintenance procedure; and
- program instructions to generate a custom guide for the user including the extracted at least one imperative statement based on the feedback from by the user.

20. The computer system of claim 19, the program instructions further comprising:
- program instructions to collect a plurality of feedback from a plurality of users that performed the maintenance procedure;
- program instructions to identify a common change in the plurality of feedback; and
- program instructions to generate a new user guide for the maintenance procedure based on the common change in the plurality of feedback.

* * * * *